United States Patent
Spyridopoulos et al.

(10) Patent No.: US 12,380,206 B2
(45) Date of Patent: Aug. 5, 2025

(54) DETECTION OF MODEL ATTACKS IN DISTRIBUTED AI

(71) Applicant: Kabushiki Kaisha Toshiba, Tokyo (JP)

(72) Inventors: Theo Spyridopoulos, Bristol (GB); Aftab Khan, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1094 days.

(21) Appl. No.: 16/952,726

(22) Filed: Nov. 19, 2020

(65) Prior Publication Data

US 2022/0156368 A1    May 19, 2022

(51) Int. Cl.
*G06N 20/00* (2019.01)
*G06F 21/55* (2013.01)

(52) U.S. Cl.
CPC .......... *G06F 21/554* (2013.01); *G06N 20/00* (2019.01)

(58) Field of Classification Search
CPC .......... G06N 20/00; G06N 3/045; G06N 3/08; G06F 21/566
See application file for complete search history.

(56) References Cited

U.S. PATENT DOCUMENTS

| | | | |
|---|---|---|---|
| 2015/0294246 A1* | 10/2015 | Guven Kaya | G06Q 10/0635 |
| 2019/0332944 A1* | 10/2019 | Bai | G06N 3/084 |
| 2023/0289591 A1* | 9/2023 | Cyras | G06N 3/08 |

FOREIGN PATENT DOCUMENTS

WO    WO 2019/105543 A1    6/2019

OTHER PUBLICATIONS

Preuveneers, Davy et al. "Chained Anomaly Detection Models for Federated Learning: An Intrusion Detection Case Study." Applied Sciences, vol. 8, No. 12 (Year: 2018).*
Kang, Zhiping, et al. "Spatial-temporal correlative fault detection in wireless sensor networks." (Year: 2014).*
Caldas, et al. "Expanding the reach of federated learning by reducing client resource requirements." (Year: 2018).*

(Continued)

*Primary Examiner* — Michelle T Bechtold
*Assistant Examiner* — Matiyas T Maru
(74) *Attorney, Agent, or Firm* — Oblon, McClelland, Maier & Neustadt, L.L.P.

(57) ABSTRACT

A method for detecting an attack on a distributed artificial intelligence deployment comprising a plurality of worker devices. Each of the plurality of worker devices comprises a local machine learning model. Each local machine learning model comprises a plurality of layers. The method comprises calculating a first inference from first input data using a first machine learning model comprising layers of the plurality of layers of one or more of the local machine learning models and calculating additional inferences from the first input data using one or more additional machine learning models. Each of the additional machine learning models comprises at least one of the layers used in the first machine learning model and at least one layer from the pluralities of layers of the one or more local machine learning models that is not used by the first machine learning model. The method further comprises calculating differences between the first inference and each of the one or more additional inferences.

16 Claims, 9 Drawing Sheets

(56) References Cited

OTHER PUBLICATIONS

Narayanan, et al., "PipeDream: Generalized pipeline parallelism for DNN training." (Year: 2019).*
Awan, et al. "Hypar-flow: Exploiting mpi and keras for scalable hybrid-parallel dnn training using tensorflow." (Year: 2019).*
Tolpegin, et al. "Data poisoning attacks against federated learning systems."(Year: 2020).*
Fang, et al. "Local model poisoning attacks to {Byzantine-Robust} federated learning." (Year: 2020).*
Zhao, et al. "Detecting and mitigating poisoning attacks in federated learning using generative adversarial networks." (Year: 2020).*
Minghong Fang, et al., "Local Model Poisoning Attacks to Byzantine-Robust Federated Learning" $29^{th}$ Usenix Security Symposium, Aug. 2020, arXiv:1911.11815v2, 18 pages.

* cited by examiner

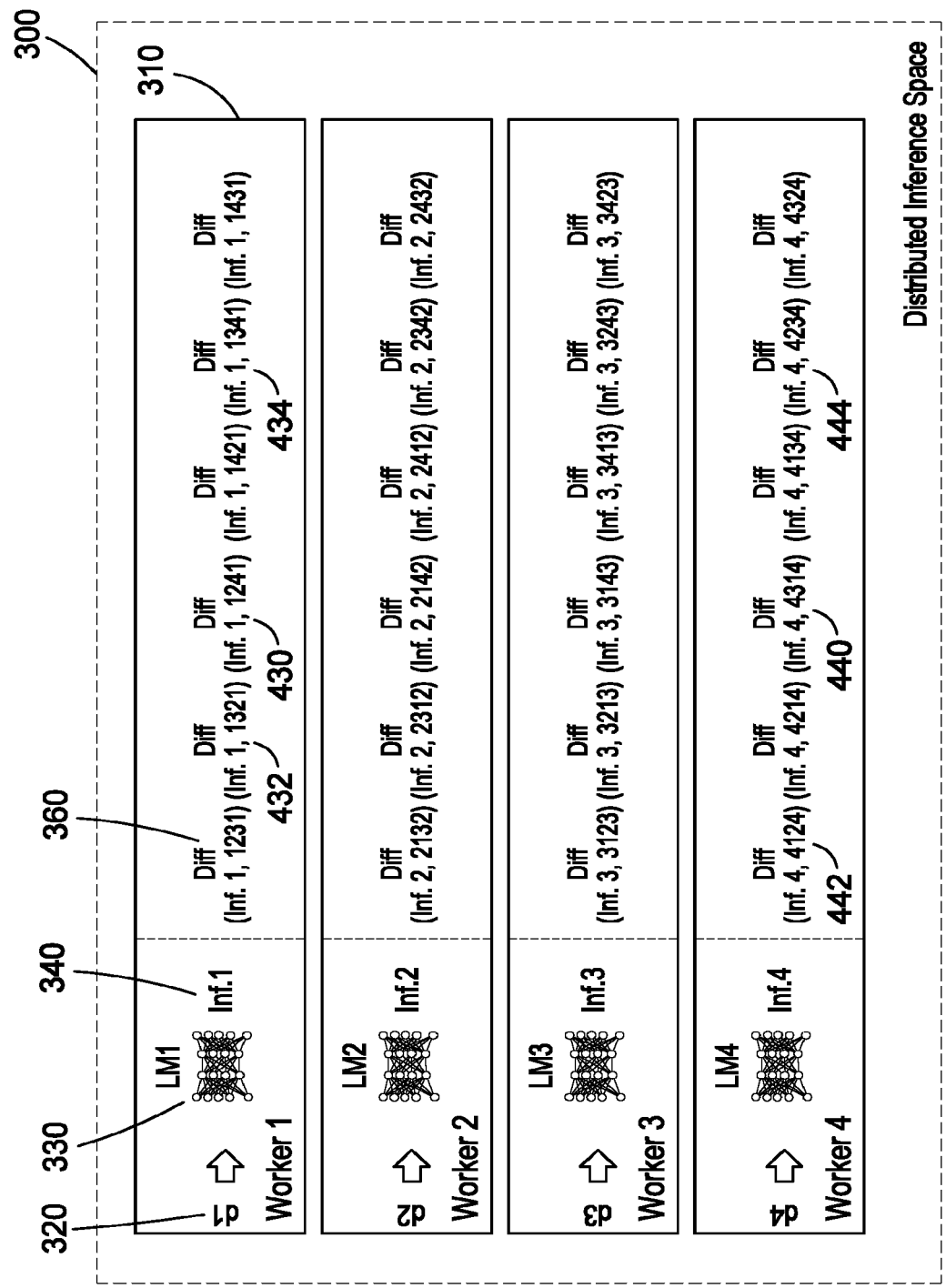

DETECTION OF MODEL ATTACKS IN DISTRIBUTED AI

FIELD

Embodiments described herein relate to methods and systems for detecting attacks on worker systems of distributed artificial intelligence deployments such as federated learning deployments.

BACKGROUND

Federated learning is a distributed machine learning approach in which a plurality of worker devices train local machine learning models using their own local data. The local models, or parameters thereof, are then aggregated to generate or update a global machine learning model, which may then be shared with all of the worker devices.

Federated learning deployments may be attacked by attacking the models of individual worker devices, either by an attacker with access to a worker device directly altering parameters of that worker device's local model, or by an attacker injecting malicious data samples into the data that a worker uses to train its local model (referred to as a data poisoning attack). The models of one or more worker devices being compromised as a result of such attacks can compromise in the global model and subsequently impact all of the worker devices to which the global model is deployed. Attacks on individual workers can result in worker devices experiencing *byzantine* failures.

Arrangements of the embodiments will be understood and appreciated fully from the following detailed description, made by way of example only and taken in conjunction with the drawings in which:

FIG. 3C shows differences between local and distributed inferences calculated by the worker devices of FIG. 3A;

DETAILED DESCRIPTION

Figure 1:
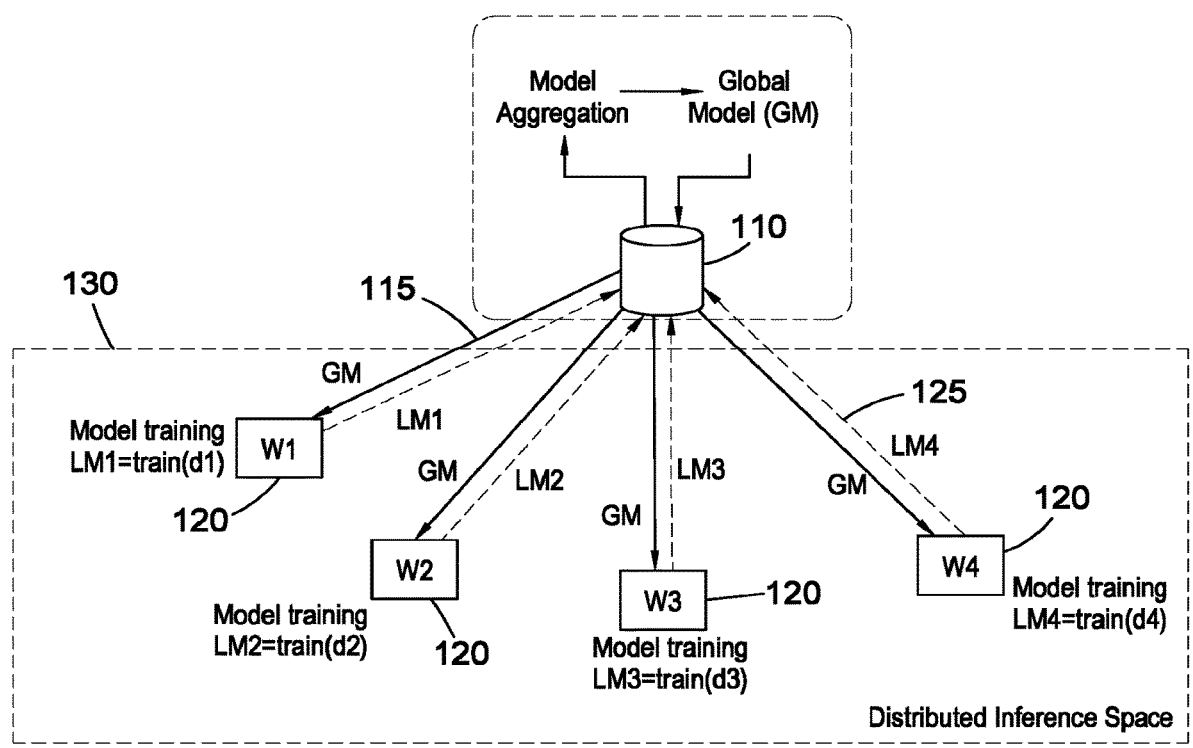
FIG. 1 is a diagram of an example of a federated learning deployment.

According to an embodiment there is provided a method for detecting an attack on a distributed artificial intelligence deployment comprising a plurality of worker devices. Each of the plurality of worker devices comprises a local machine learning model. Each local machine learning model comprises a plurality of layers. The method comprises calculating a first inference from first input data using a first machine learning model comprising layers of the plurality of layers of one or more of the local machine learning models and calculating additional inferences from the first input data using one or more additional machine learning models. Each of the additional machine learning models comprises at least one of the layers used in the first machine learning model and at least one layer from the pluralities of layers of the one or more local machine learning models that is not used by the first machine learning model. The method further comprises calculating differences between the first inference and each of the one or more additional inferences.

In an embodiment the first machine learning model is a first worker device's local machine learning model.

In an embodiment each additional machine learning model is a distributed machine learning model, each distributed machine learning model comprising at least one layer of the plurality of layers of the local machine learning model of the first worker device and at least one layer of the plurality of layers of a local machine learning model of another worker device.

In an embodiment each distributed machine learning model comprises an input layer of the first worker device's local machine learning model.

In an embodiment each distributed machine learning model comprises an output layer of the first worker device's local machine learning model.

In an embodiment each of the one or more distributed machine learning models comprises intermediate layers and all of the intermediate layers of each distributed machine learning model are intermediate layers of local models of different worker devices other than the first worker device.

In an embodiment the local and distributed machine learning models are artificial neural networks.

In an embodiment each of the local and distributed learning models comprises the same number of layers and the same number of neurons in the same respective layers.

In an embodiment a plurality of additional inferences are calculated using a plurality of local models each comprising a different combination of layers.

In an embodiment the plurality of additional models comprise each possible combination of layers including the input and output layers of the first worker device's local model and intermediate layers of different other worker devices' local models.

In an embodiment each of the plurality calculated differences between the local inference and the plurality of additional inferences are compared to a threshold, and any of the plurality of local models which comprise layers in all of the additional models with which additional inferences differing from the local inference of the first worker device by more than the threshold were calculated are identified.

In an embodiment the distributed artificial intelligence deployment is a federated learning deployment.

In an embodiment the method further comprises selectively aggregating all of the plurality of local models which do not comprise layers in all of the additional models with which additional inferences differing from the local inference of the first worker device by more than the threshold were calculated.

In an embodiment the plurality of local models which do not comprise layers in all of the additional models with which additional inferences differing from the local inference of the first worker device by more than the threshold were calculated are selectively aggregated to define a new machine learning model. The method further comprises replacing the local machine learning models which do not comprise layers in all of the additional machine learning models with which additional inferences differing from the local inference of the first worker device by more than the threshold were calculated with the new machine learning model.

In another embodiment there are provided one or more non-transitory storage media comprising computer instructions executable by one or more processors. The computer instructions when executed by the one or more processors causing the processors to perform a method for detecting an attack on a distributed artificial intelligence deployment comprising a plurality of worker devices. Each of the plurality of worker devices comprises a local machine learning model. Each local machine learning model comprises a plurality of layers. The method comprises calculating a first inference from first input data using a first machine learning model comprising layers of the plurality of layers of one or more of the local machine learning models, calculating an additional inference from the first input data using one or more additional machine learning models, each of the additional machine learning models comprising at least one of the layers used in the first machine learning model and at least one layer from the pluralities of layers of the one or more local machine learning models that is not used by the first machine learning model and calculating differences between the first inference and each of the one or more additional inferences.

In another embodiment there are provided a worker device comprising an antenna, a memory and a processor. The memory comprises computer instructions executable by the processor. The computer instructions, when executed by the processor, cause the processor to perform a method for detecting an attack on a distributed artificial intelligence deployment comprising the worker device and one or more additional worker devices. Each of the plurality of worker devices comprises a local machine learning model. Each local machine learning model comprises a plurality of layers. The method comprises calculating a first inference from first input data using a first machine learning model comprising layers of the plurality of layers of one or more of the local machine learning models and calculating an additional inference from the first input data using one or more additional machine learning models. Each of the additional machine learning models comprises at least one of the layers used in the first machine learning model and at least one layer from the pluralities of layers of the one or more local machine learning models that is not used by the first machine learning model. The method further comprises calculating differences between the first inference and each of the one or more additional inferences.

In an embodiment the device is further configured to calculate the additional inference by transmitting data for partially calculating said inference to another worker device of the plurality of worker devices alongside an indication of a layer within the other worker device that is to be used for said partial calculation of said additional inference. The data is either input data for calculating said additional inference or data generated by a layer of the local model of the worker device in the process of calculating said additional inference.

In an embodiment the device is further configured to receive layers of local models of other worker devices of said plurality of worker devices and to generate said additional machine learning model using said received layers.

FIG. 1 shows an example of a federated learning deployment 100 in which embodiments of methods and systems for attack detection described herein may be used. The deployment 100 comprises a central server 110 and four worker devices 120 (W1, W2, W3 and W4) configured to train a machine learning model.

In use, the central server 110 distributes 115 a copy of an initial global machine learning model (GM) to each of the plurality of worker devices 120, the distributed copies forming local models (LM1, LM2, LM3 and LM4) on each of the worker devices. Each of the worker devices 110 then separately trains its local model using local data on and/or obtained by that worker device before sending 125 its trained local model or parameters thereof to the central server 110 without providing the local data on which the local model was trained. The central server 110 then aggregates the local models provided by the plurality of worker devices to construct a global model.

The updated global model may be redeployed to the worker devices 120 for use and/or further training. The plurality of worker devices 120 with a global model deployed thereon may define a distributed artificial intelligence deployment.

The worker devices 120 may be servers, smartphones, edge devices or other computing devices. The illustrated deployment 100 comprises four worker devices 120, however, it will be appreciated that deployments may comprise more or less worker devices. In some deployments, the worker devices 120 may collect their own data with which they train their local models. For example, the worker devices may comprise sensors, which may detect the data used to train the local models of those worker devices.

The illustrated federated learning deployment 100 is a centralized deployment, in which a central server 110 (such as a cloud and/or backend server) aggregates the multiple local models to form a global model. It will be appreciated that embodiments of methods and systems for attack detection described herein may also be used in decentralized federated learning deployments in which the multiple local models are aggregated by the plurality of worker devices 120 themselves.

The four worker devices 120 may together define a distributed inference space 130 in embodiments described herein.

Figure 2A:
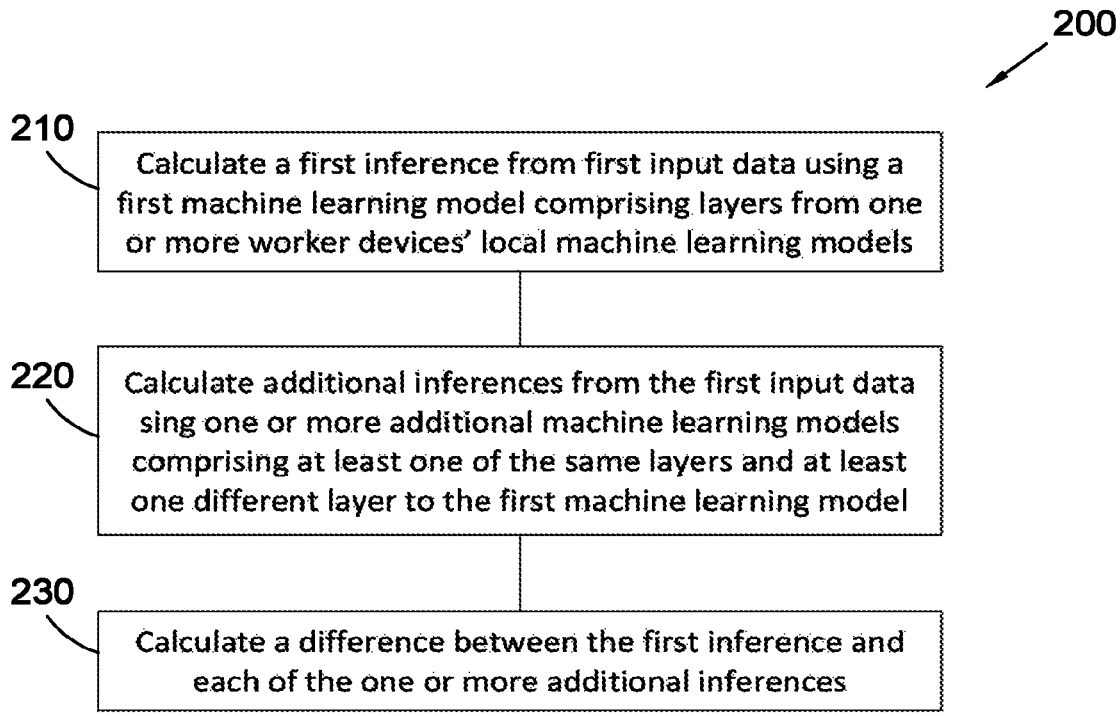
FIG. 2A is a flowchart of first embodiment of a method for detecting attacks on worker devices of a federated learning deployment.
Figure 2B:
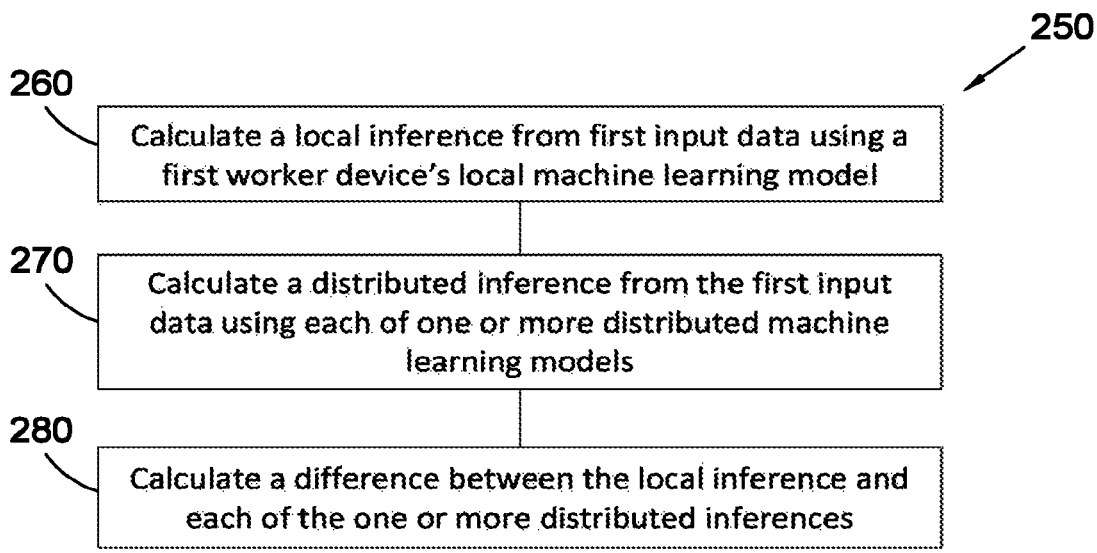
FIG. 2B is a flowchart of a second embodiment of a method for detecting attacks on worker devices of a federated learning deployment.

FIGS. 2A and 2B are flowcharts of embodiments of methods 200, 250 for detecting attacks on worker devices of a distributed artificial intelligence deployment, such as a federated learning deployment. For example, the method may be performed in the federated learning deployment as described above with reference to FIG. 1. The methods may be computer implemented. The second method 250 shown in FIG. 2B is a more specific embodiment of the first method 200 shown in FIG. 2A.

The artificial intelligence deployment comprises a plurality of worker devices, each with their own local machine-learning model. The machine learning models may be deep neural networks such as convolutional neural networks. Alternatively, the machine learning models may be stacked machine learning models, such as ensemble learning, comprising a plurality of machine learning models, each layer comprising one or machine learning models in their entirety. The present disclosure is generally applicable to any federated learning arrangements in which intermediate results are passed between layers as long as the local workers involved in the system all use the same global model as their starting point for local training. These layers may be layers of deep neural networks, such as convolutional neural networks.

Alternatively, the layers be stages in a chain of computation used for generating the inference, wherein stages of this chain of computation pass intermediate results to other stages in the chain.

The local models each comprise a plurality of layers and each comprise the same configuration of layers (such as the same number of layers and number of neurons per layer in embodiments in which the local models are neural networks). The local models of the plurality of worker devices are preferably separately trained versions of a single initial machine learning model, such as a model distributed by a central server. Parameters of the local models (such as the weights of the models wherein the models are neural networks) may vary between the local models, for example as a result of the local models having been trained using different data by the different worker devices.

A first step 210 of the first method 200, comprises calculating a first inference from first input data using a first machine learning model comprising and/or defined by layers of one or more of the local machine learning models.

In the first step 260 of the second method 200, the first inference is a local inference calculated from the first input data using a first worker device's local model. The first input data may be local data of the first worker device, such as data collected by the first worker device. This local inference may be calculated on and/or by the first worker device.

In alternative embodiments of the first method 200, the first inference may be a distributed inference as described below.

A second step 220 of the first method 200 comprises additional inferences from the first input data using one or more additional machine learning models. Each of the additional machine learning models comprises at least one of the layers from the one or more local machine learning models that is comprised by the first machine learning model and at least one of the layers from the one or more local machine learning models that is not comprised by the first machine learning model.

In the second step 270 of the second method 200, the additional inferences are distributed inference calculated from the first input data using each of one or more distributed models. Each distributed model comprises at least one layer of the first worker device's local model and at least one layer of another worker device's local model.

Each of the one or more distributed models comprises the same number of layers and the same configuration of layers (such as the same number of neurons per layer in embodiments in which the model is a neural network) as each of the local models. Each of the layers of the one or more distributed models may be a corresponding layer (a layer in the same position within the model) of the local model of one of the plurality of worker devices.

For example, in an embodiment in which the local and distributed machine learning models comprise four layers, one of the one or more distributed models may comprise the first (input) layer of the first worker device's local model, the second layer of a second worker device's local model, the third layer of a third worker device's local model, and the fourth (output) layer of the first worker device's local model.

In some embodiments, some or all of the one or more distributed models may comprise the input layer and/or the output layer of the first worker device's local model. All of the intermediate (hidden) layers of such one or more distributed models may be comprised by layers of other devices' local models.

In some embodiments, all of the intermediate layers of some or all of the one or more may be layers of local models of worker devices other than the first worker device. Alternatively, or additionally, the intermediate layers of some or all of the one or more distributed models may all be from different local models (the local models of different worker devices).

In some embodiments, the one or more distributed models may be a plurality of distributed models, each of which may comprise different combinations of layers. In some embodiments, the plurality of distributed models may comprise each possible combination of layers including the input and output layers of the first worker device's local model and intermediate layers all comprised by taken from different other worker devices' local models.

For example, in embodiment in which the machine learning model comprises four layers and the deployment comprises four worker devices, there may be six possible combinations of layers with the first (input) layer and fourth (layer) being the input and output layers of the first worker device's local model. In the six distributed models, the second and third layers may be the second and third layers of the second and third worker devices' local models respectively, of the third and second worker devices' local models respectively, of the second and fourth worker devices' local models respectively, of the fourth and second worker devices' local models respectively, of the third and fourth worker devices' local models respectively, and of the fourth and third worker devices' local models respectively.

Calculating a distributed inference may comprise routing and/or transmitting the output of one, some, or each non-output layer of the distributed model to the worker device whose local model includes and/or defines the subsequent layer of the distributed model. Each layer of the distributed machine learning model may therefore by calculated on and/or by the worker device whose local machine learning model comprises that layer.

For example, in an embodiment, in which a distributed model comprises the first (input) layer of the first worker device's local model and the second layer of a second worker device's local model, the output of the first (input) layer of the first worker device's local model may be transmitted to the second worker device and input into the second layer thereon.

Alternatively, calculating a distributed inference may comprise the worker device(s) whose local model(s) include and/or define the layers of the distributed model not comprised or defined by the local model of a single worker device by or on which the distributed inference is calculated, transmitting these layers (or parameters, such as weightings, thereof) to that worker device.

In further alternative embodiments, the calculation of one or more distributed inferences may be performed by a central server, to which the layers (or parameters, such as weightings, thereof) are transmitted. For example, the calculation may be performed by a central server 110 as described above with reference to FIG. 1.

While in the illustrated methods 200, 250, the first (for example, local) inferences are calculated in a first step and the one or more additional (for example, distributed) inferences are calculated in a second step, it will be appreciated that one or more additional inferences and the first inference may be calculated in any order. For example, the first inference may be calculated before, after, between, or simultaneous to the calculations of the one or more additional inferences.

A third step 230 of the first method 200 comprises calculating a difference between the calculated first inference and each of the calculated additional inferences. The third step 280 of the second method 250 comprises calculating a difference between the calculated local inference and each of the one or more calculated distributed inferences.

The calculated one or more differences between the first (for example, a local) inference and each of the one or more calculated additional (for example, distributed) inferences may be compared to a threshold, such as a pre-determined threshold which may depend upon the model being trained by the federated learning deployment. A difference between a first and an additional inference exceeding such a threshold may indicate that one of the layers of one or both of the first and the additional models is comprised by a worker device that has been attacked (for example, in the second method 250, one of the layers of the distributed model with which that distributed inference was calculated). Attacks on individual worker devices may be expected to cause the local model (and by extension the layers thereof) of that worker device to deviate from those of other worker devices, whereas natural model decay would affect all of the worker devices' local models generally similarly resulting in now significant increase in the calculated difference.

In embodiments in which differences between the first inference and each of a plurality of additional inferences are calculated, each of such differences may be compared to such a threshold. In embodiments in which the plurality of additional inferences are distributed inferences calculated using distributed models comprising different combinations of layers, which of the plurality of models has been attacked may be identified from which of the local models comprises layers in all of the distributed models with which distributed inferences differing from the local inference by more than the threshold.

For example, consider an embodiment in which the distributed artificial intelligence deployment comprises four worker devices with local models comprising four layers, in which distributed differences are calculated using the six distributed models described above (each distributed model comprising the input and output layers of the first worker device's local model). If the threshold is only be exceeded by the differences between the local inference and the distributed inferences calculated using the models comprising the second and third layers of the second and fourth worker devices' local models respectively, of the fourth and second worker devices' local models respectively, of the third and fourth worker devices' local models respectively, and of the fourth and third worker devices' local models respectively, the fourth worker device may be determined to have been attacked. In contrast, if all the calculated differences exceeded the threshold, the first worker device may be determined to have been attacked.

Embodiments of the method described above may be performed by the first node, which may calculate the local inference using its own local model and calculate the one or more distributed inferences using one or more distributed models (which are partially defined by its own local model and partially defined by one or more other worker devices' local models). The first node may then calculate the one or more differences between the local inference and the one or more distributed inferences. The first input data may be local data of the first node.

The first node calculating the distributed inference using the distributed model may comprise defining or constructing the one or more distributed models, for example, by defining a routing path specifying a sequence of worker devices and model layers thereof. The first node may initiate the calculation of the distributed inference, for example by inputting the first data into a first (input) layer of the distributed model defined by the first (input) layer of its local model. The first node may complete the calculation of the distributed inference, for example with a final (output) layer of the distributed model defined by the final (output) layer of its local model.

In some embodiments, some or all of the worker devices of the distributed artificial intelligence deployment may perform a method as described above, which may allow each worker device to determine which of the worker devices have been attacked and potentially compromised.

The one or more worker devices performing methods as described above may perform the methods simultaneously, which may advantageously increase the efficiency of attack detection. Alternatively, some or all of the worker devices may perform methods as described above at different times, and/or independently from each other.

In some embodiments, the method 200, 250 may further comprise replacing the local model (or parameters, such as weightings, thereof) of one or more worker devices if they are determined to have been attacked.

In embodiments in which the distributed artificial intelligence deployment is a federated learning deployment, such as the centralised federated learning deployment 100 shown in FIG. 1, the local models (or parameters thereof) of some or all of the worker devices that have not been identified as having been attacked may be aggregated to form a new global model when and/or if a worker device is determined to have been attacked. The new global model is generated using local models that have not been identified as producing inferences that are inconsistent with the inferences produced by other local models in the sense described herein. Put in other words, local models that have been identified as producing inferences that are inconsistent with the inferences produced by other local models in the sense described herein are excluded from aggregation. The new global model (or parameters thereof) may be distributed to the worker devices that have been determined to have been attacked to replace their local models. The new global model (or parameters thereof) may also be distributed to some or all of the worker devices that have not been determined to have been attacked to replace their local models.

In some embodiments, the aggregation of the local models (or parameters thereof) of some or all of the worker devices that have not been identified as having been attacked may be triggered by a worker device determining that a model has been attacked. For example, a worker device detecting an attack on a worker device (on itself or on another worker device) may trigger a selective aggregation of the local models of the federated learning deployment to update a global model. For example, upon detecting an attack, a worker device may transmit a signal to a central server, such as the central server 110 of a centralised federated learning deployment 100 as shown in FIG. 1, to trigger a selective aggregation. A selective aggregation may comprise aggregating the local models, or parameters thereof (such as weightings of neural network local models), of each non-attacked worker device. In some embodiments each non-attacked worker device may transmit its local model, or parameters thereof, to a central server to be aggregated. Local models of worker devices that have been identified as having been attacked are preferably not aggregated. In a decentralised federated learning deployment, the worker device may instead trigger an aggregation by transmitting a signal to one or more other worker devices.

After such a selective aggregation has been performed to update a global model, the global model (or parameters thereof) may be distributed to some or all of the worker devices to replace their local models (or parameters thereof). This may advantageously replace local models that have been compromised by malicious attacks on their worker devices.

In alternative embodiments, the local models (or parameters thereof) of worker devices that have been determined to have been attacked may be replaced by one or more other local models (or parameters thereof). For example, attacked local models (or parameters thereof) may be replaced by copies of the local models (or parameters thereof) of other worker devices that have not been determined to have been attacked Embodiments of attack detection methods as described above advantageously do not require a central server to maintain a continuously updated trusted input data set for evaluating the contribution of local models to the global model itself. Additionally, the methods enable the worker devices to detect when they or other workers are malfunctioning or have been attacked, in contrast to existing federated learning attack detection methods which only attempt to identify attacked workers with the central server.

In an embodiment, a first worker (worker n) may calculate distributed inferences using distributed models comprising its own input layer, first hidden layer, and output layer as well as hidden layers of other worker devices specified by a routing path. An example of computer instructions for such a worker may be given by:

```
For worker_n in set_of_workers do
    generate routing_paths
    for path in routing_paths do
        tmp_layer=1;
        tmp_out=data(worker_n)×layer_weights(worker_n,tmp_layer);
        path=path.pop(0);
        transmit(tmp_out,path,tmp_layer,to_next_worker_in_path);
        for worker in path do
            receive(tmp_out,path,tmp_layer);
            tmp_layer=tmp_layer+1;
            tmp_out=tmp_out×layer_weights(worker_n,tmp_layer);
            path=path.pop(0)
            if worker ≠ worker_n then
                transmit(tmp_out,path,tmp_layer,to_next_worker_in_path);
            else
                break;
            end
        end
        distributed_inf[worker_n,path]=tmp_out;
    end
end
```

Where worker_n is the first worker, set_of_workers is the set of workers of the deployment, routing_paths is a set of routing paths specifying a sequence of worker devices. The sequence begins with the first hidden layer of the first worker device and ends with the output layer of the first worker device, and has a number of entries equal to the number of hidden and output layers in the local models thereof. Each routing path defines one of the distributed models by specifying the worker device (and by extension local model) to which each layer of the distributed model belongs.

In some embodiments, each entry of a routing path other than the first and final value may be a different worker device. In such embodiments, the worker device may generate as many different routing paths comprising its own first hidden layer and output layer as are possible within the deployment. The maximum number of possible different routing paths may be given by:

$$\text{Maximum number of routing paths} = \frac{(b-1)!}{((b-1)-(c-2))!}$$

Where b defines the number of worker devices and c is the number of non-input layers in each of the machine learning models.

tmp_layer is a layer counter that is incremented with each non-input layer (i.e. each layer with weights on its inputs) of the distributed model, and tmp_out defines the running values of layers progressing through layers defining the distributed model, starting with the data(worker_n), the local data of the first worker device. The function layer_weights (worker,tmp_layer) defines the weightings of each neuron of a specific layer of a specific worker device defined by the variables tmp_layer and worker. After the running values, tmp_out, are scaled by the weights of a layer of a worker device, they are transmitted to the next worker device in the routing path and the layer counter, tmp_layer, is incremented and the function path=path.pop(0) removes the completed layer from the routing path.

After all the workers and layers on the routing path have been propagated through, and the output layer of the first worker device, worker_n, is reached, the values of tmp_out are outputted as the distributed inference of the first worker and the routing path by which it was generated, distributed_inf[worker_n,path].

Figure 3A:
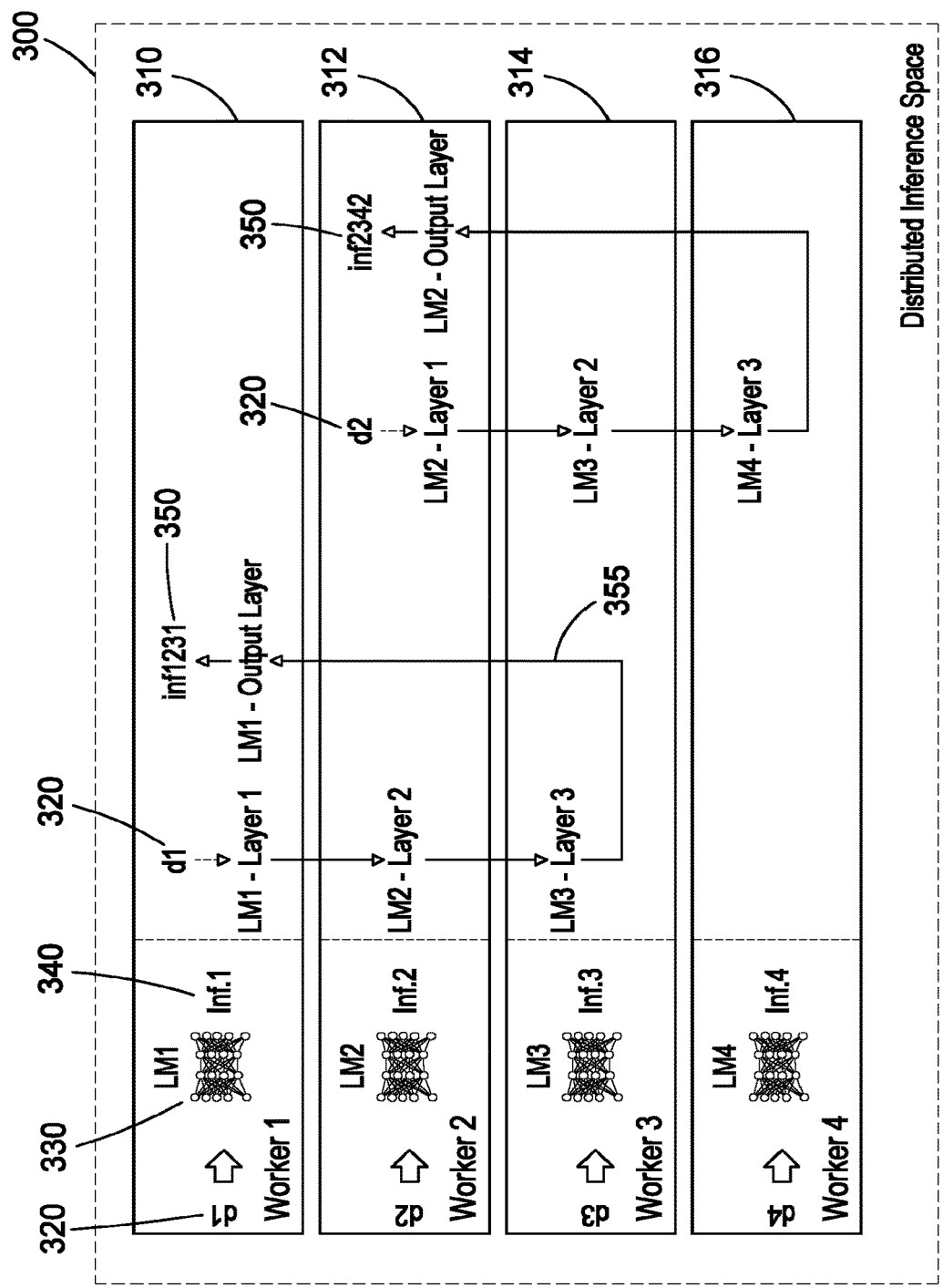
FIG. 3A is a diagram of a distributed inference space comprising a plurality of worker devices calculating local and distributed inferences.

FIG. 3A shows an example of four worker devices (Worker 1, Worker 2, Worker 3, and Worker 4) 310, 312, 314, 316 of a federated learning deployment calculating local and distributed inferences 340, 350 from their local data 320. The four worker devices together define a distributed inference space 300 within which the distributed inferences 350 are calculated.

Each of the four worker devices 310, 312, 314, 316 comprises a local model (LM1, LM2, LM3, and LM4) 330. The local models 330 are neural networks, each comprising a first input layer, two intermediate layers, and a fourth output layer. The four local models 330 are separately trained versions of an initial global model, and as such each of the models 330 comprises the same number of neurons per layer, but may have different weightings for the connections between their neurons.

Each of the four worker devices 310, 312, 314, 316 comprises its own local data (d1, d2, d2, and d4) 320, which may be data collected by that worker device 310, 312, 314, 316.

Each of the four worker devices 310, 312, 314, 316 calculates a local inference (Inf. 1, Inf. 2, Inf. 3, and Inf. 4) 340 from its local data 320 using its own local model 330.

FIG. 3A further shows calculation of a single distributed inference 350 by each of the first and second worker devices 310, 312 (worker 1 and worker 2) from their own local data 320 (d1 and d2 respectively) using distributed models defined by these worker devices 310, 320 using routing paths 355. It will be appreciated from FIG. 3B that in use each of the four worker devices 310, 312, 314, 316 calculates six such distributed inferences 350 however only two are shown in FIG. 3A for purposes of visual clarity.

As shown in FIG. 3A, the first worker device (Worker 1) 310 calculates a distributed inference 350 denoted inf1231, the numbers of which, in order, indicate which of the local models 330 (and by extension, which of the worker devices 310, 312, 314, 316) provide the individual layers of the distributed model.

For example, the distributed model with which the distributed inference inf1231 is calculated comprises a first layer (input layer) defined by the first layer of the first worker device's local model 330 (LM1—Layer 1), a second layer (first hidden or intermediate layer) defined by the second layer of the second worker device's local model 330 (LM2—Layer 2), a third layer (second hidden or intermediate layer) defined by the third layer of the third worker device's local model 330 (LM3—Layer 3), and a fourth layer (output layer) defined by the fourth layer of the first worker device's local model 330 (LM1—Output Layer).

The distributed model with which the distributed inference inf1231 is generated is defined by a routing path 355 generated by the first worker device 310, the routing path being: first worker device 310→second worker device 312→third worker device 314→first worker device 310.

FIG. 3A also shows the second worker device (Worker 2) 312 calculating a distributed inference inf2342. This distributed inference 352 is generated using a distributed model defined by the routing path 353: second worker device 312→third worker device 314→fourth worker device 316→second worker device 312.

The data from which each distributed inference 350 is the local data of the worker device 310, 312, 314, 316 whose input layer (and by extension output layer) is used in the distributed model with which that distributed inference 350 is calculated.

While FIG. 3A shows the distributed inferences being calculated by the outputs of a layer on one node being transmitted to another node to be input into another layer thereon, it will be appreciated that in alternative embodiments, all layers of the distributed model may be calculated on a single calculating worker device (for example, the worker device whose local data is used). In such embodiments the worker device(s) whose local model(s) include and/or define the layers of the distributed model not comprised or defined by the local model of the calculating worker device may transmit these layers (or parameters, such as weightings thereof) to the calculating worker device In order to identify attacks on the worker devices 310, 312, 314, 316, each of the worker devices 310, 312, 314, 316 calculates distributed inferences using all possible distributed models comprising that worker device's local model's input and output layers and a sequence of intermediate layers of other worker devices' local models, without using more than one intermediate layer from each local model. In the federated learning deployment shown in FIGS. 3A to 3E in which the machine learning models comprise four layers and there are four worker devices 310, 312, 314, 316, each worker device 310, 312, 314, 316 is able to define six routing paths (and by extension six distributed models) and calculate six different distributed inferences 350.

Figure 3B:
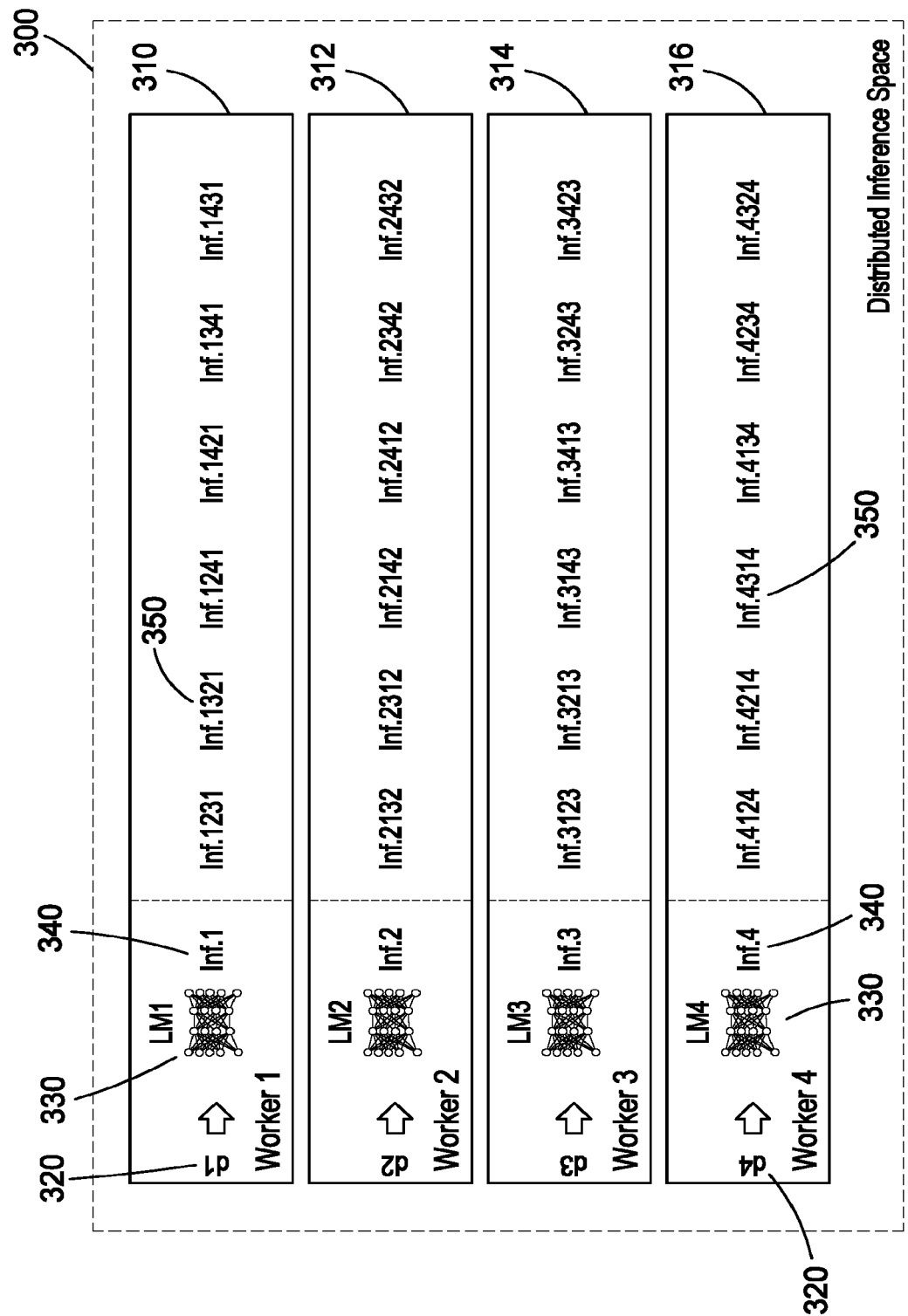
FIG. 3B shows local and distributed inferences calculated by the worker devices of FIG. 3A.

FIG. 3B shows all of the local and distributed inferences that are calculated by the worker devices 310, 312, 314, 316 of the federated learning deployment shown in FIGS. 3A to 3E.

The first worker device 310 calculates the local inferences 350 inf1231, inf1321, inf1241, inf1421, inf1341 and inf1431. The second worker device 312 calculates the local inferences 350 inf2132, inf2312, inf2142, inf2412, inf2342 and inf2432. The third worker device 314 calculates the local inferences 350 inf3123, inf3213, inf3143, inf3413, inf3243 and inf3423. The fourth worker device 316 calculates the local inferences 350 inf4124, inf4214, inf4314, inf4134, inf4234 and inf4324.

In order to identify attacks on the worker devices 310, 312, 314, 316, each of the worker devices 310, 312, 314, 316 calculates the differences 360 between the local inference 340 that it calculated and each of the distributed inferences 350 that it calculated. These differences 360 are denoted by Diff, followed by the inferences between which they are calculated in parenthesis. For example, the difference 360 between local inference Inf.2 and distributed inference inf2412 is denoted Diff(Inf. 2, inf2412).

Each of the calculated differences 360 is compared to a pre-determined threshold. A difference 360 exceeding a threshold indicates that at least one of the layers of the distributed model with which the distributed inference that the difference was calculated from, is comprised by a local model (and by extension a worker device) that has been attacked.

Figure 4A:
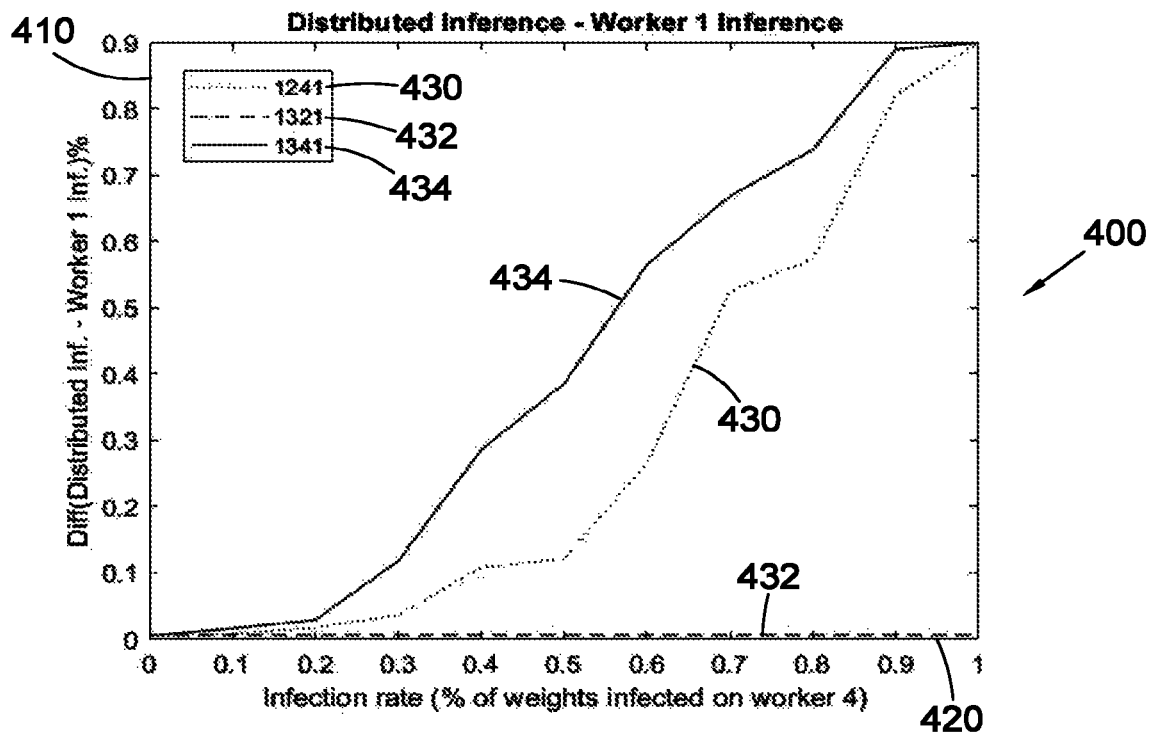
FIG. 4A is a graph of differences calculated by the first worker device of FIG. 3A at different severities of attack on the fourth worker device of FIG. 3A.
Figure 4B:
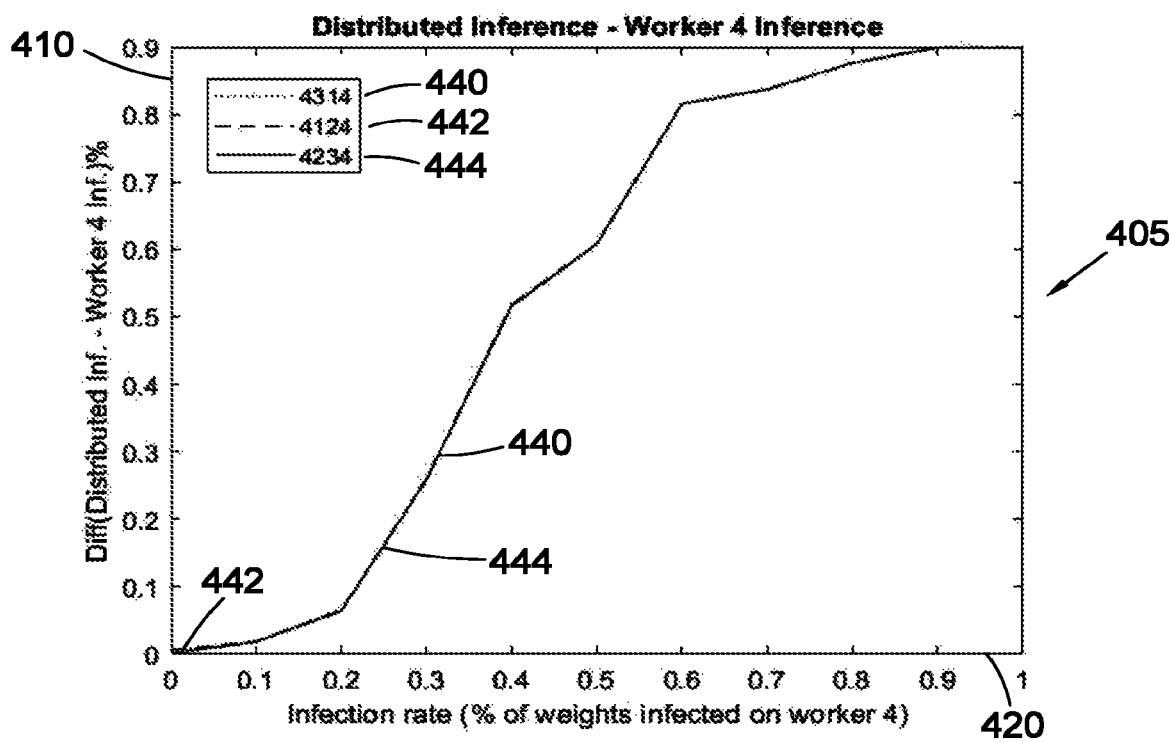
FIG. 4B is a graph of differences calculated by the fourth worker device of FIG. 3A at different severities of attack on the fourth worker device of FIG. 3A.

FIGS. 4A and 4B show example variations in six of the differences 360 (Diff(Inf. 1, inf1321) 432, Diff(Inf. 1, inf1241) 430, Diff(Inf. 1, inf1341) 434, Diff(Inf. 4, inf4124) 442, Diff(Inf. 4, inf4314) 440, Diff(Inf. 4 inf4234) 444) at different severities of attack on the fourth worker node 316.

Figure 3D:
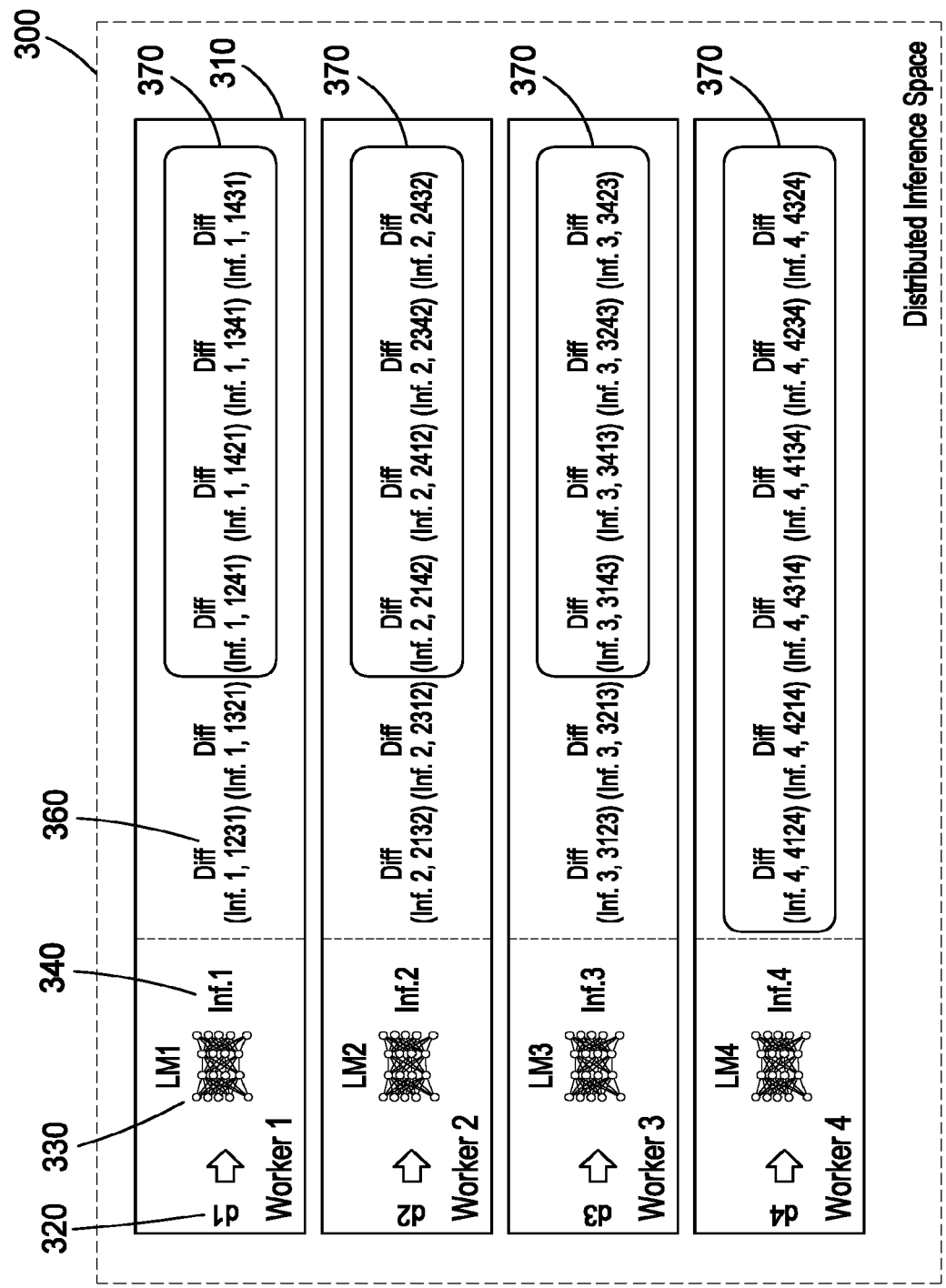
FIG. 3D shows a subset of the calculated differences between local and distributed inferences calculated by the worker devices of FIG. 3A that exceed a threshold.

FIG. 3D shows the calculated differences 360 that exceed the threshold if the fourth worker device 316 has been attacked. The calculated differences 360 that exceed the threshold are enclosed within boxes 370.

All of the differences 360 calculated by the fourth worker device 316 exceed the threshold (as they are all calculated from distributed inferences calculated using distributed models comprising layers from both the attacked fourth worker device's local model 330 and from other non-attacked worker devices' models 330).

Four of the differences 360 calculated by each of the first to third worker devices 310, 312, 314 exceed the threshold. The remaining differences 360, which are all calculated from distributed inferences that were calculated using distributed models comprising only layers from the first to third local worker devices' models 330, do not exceed the threshold.

As each of the worker devices 310, 312, 314, 316 comprises a unique combination of their calculated differences that were calculated using distributed models including layers of the fourth worker device's local model 330.

Figure 3E:
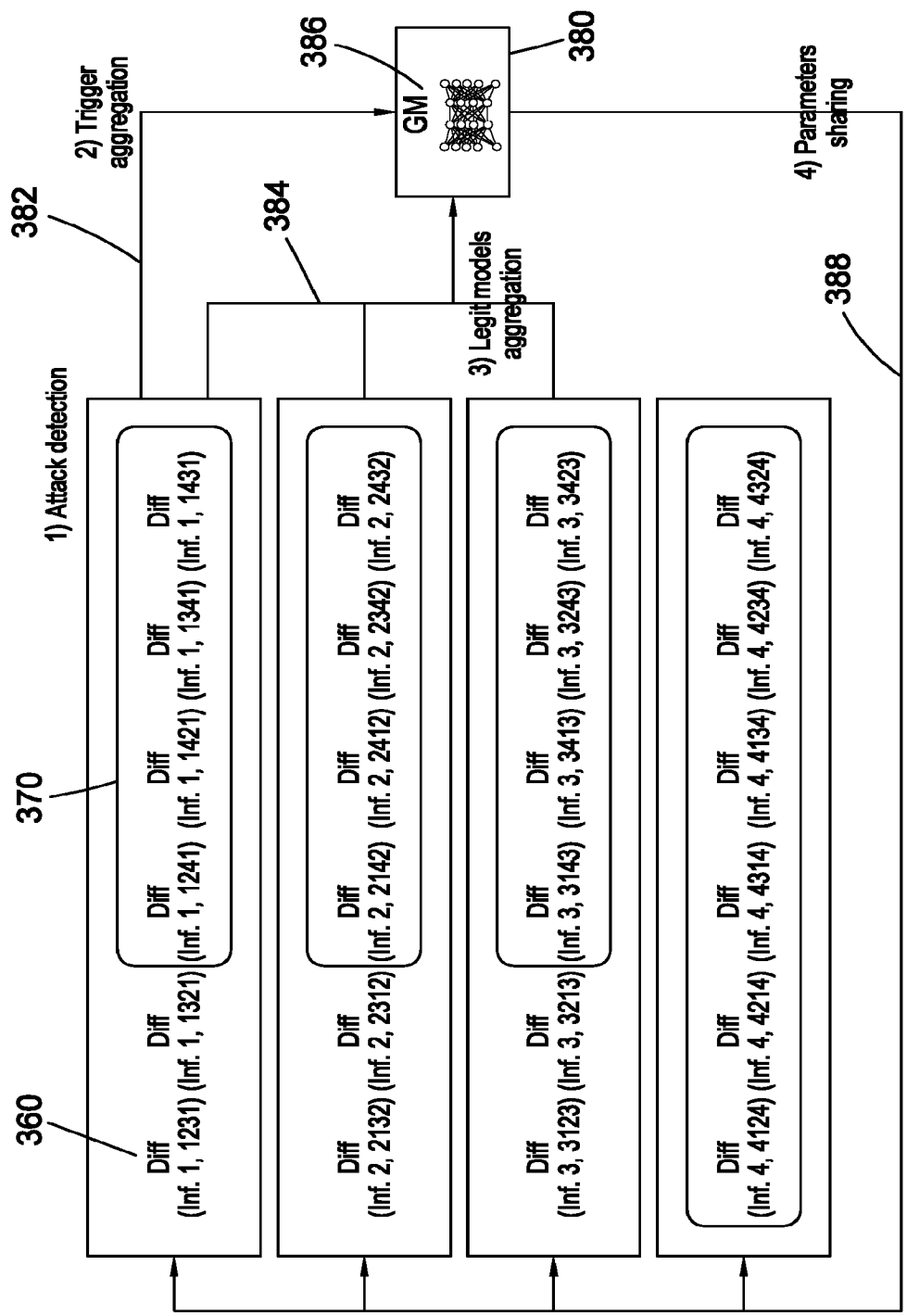
FIG. 3E shows selective aggregation and global model distribution in a federated learning deployment comprising the worker devices of FIG. 3A.

FIG. 3E shows model aggregation and redistribution steps performed by the federated learning deployment of FIGS. 3A to 3E in response to the identification of the attack on the fourth worker device.

Upon any of the worker devices 310, 312, 314, 316 identifying themselves or another worker device 310, 312, 314, 316 as having been attacked, they trigger a selective aggregation process by transmitting a signal 382 to the central server 380. This signal may indicate which of the worker devices 310, 312, 314, 316 has been identified as having been attacked. FIG. 3E shows the first worker device 310 triggering a selective aggregation process by signalling the central server 380 upon identifying that the fourth worker device 316 has been attacked.

In the triggered selective aggregation process, the local models 330 (or parameters, such as weightings, thereof) which have not been identified as having been attacked are transmitted 384 to the central server and used to produce or update a global model 386. The global model 386 is produced or updated using federated learning techniques and comprises the same number of layers and numbers of neurons per layer as the local models 330.

After the global model 386 is produced or updated, it is distributed 388 (for example by distributing parameters, such as weightings, of the global model 386) to each of the worker devices 310, 312, 314, 316) where it replaces each of the local models 330 thereon. The attacked local model 330 on the fourth worker device 316 is thereby replaced with a model derived exclusively from non-attacked local models. The deployed global model 386 may be further trained as a new local model of each of the worker devices 310, 312, 314, 316, or may be used for inference.

FIGS. 4A and 4B are graphs of three differences 360 calculated by the first and fourth worker devices 310, 316 respectively, at different severities of attack on the fourth worker device 316.

FIG. 4A shows the differences 430, 432, 434 calculated by the first worker device 310 between its local inference inf. 1 and its distributed inferences inf1241, inf1321, and inf1341 at different severities of attack on the fourth worker device 316.

The distributed differences 430, 432, 434 are given as a proportion 410 of the local inference inf. 1 at different infection rates 420 of the fourth worker device 316 which are given as a proportion of the weights of the local model 330 of the four worker device that have been compromised by an attack. The data presented in FIGS. 4A and 4B are based on simulation results in which multiple input data were used. The difference between the distributed inference and the worker inference is express as a percentage difference between the two calculated on this basis.

As shown in FIG. 4A, the difference 432 between the local inference 340 of the first worker device 310 (inf. 1) and the distributed inference inf1321 is close to zero for all infection rates 420. Distributed inference inf1321 is calculated using a distributed model that does not comprise any layers of the local model 330 of the attacked fourth worker device 316 and as such is independent of any attacks on the fourth worker device 316.

In contrast, the differences 430, 434 between the local inference 340 of the first worker device 310 (inf. 1) and the distributed inferences inf1241 and inf1341 increase with the infection rate 420. Distributed inferences inf1241 and inf1341 are both calculated using distributed models that comprise the third layer of the local model 330 of the attacked fourth worker device 316. Therefore, these distributed inferences diverge from the local inference inf. 1 (which includes no layers of the local model 330 of the attacked fourth worker device 316) as the infection rate 420 of the fourth worker device 316 increases.

As the infection rate 420 of the fourth worker device 316 increases, the differences 430, 434 between the local inference inf. 1 and the distributed inferences inf1241 and inf1341 increase until they exceed an application specific threshold. At this stage, the first worker device 310 may determine that at least one of the first, second, and fourth worker devices 310, 312, 316 has been attacked (due to Diff(inf. 1, inf1241) exceeding the threshold), that at least one of the first, third, and fourth worker devices 310, 314, 316 has been attacked (due to Diff(inf. 1, inf1341) exceeding the threshold), but that none of the first, second and third worker devices 310, 312, 314 has been attacked (due to Diff(inf. 1, inf1321) not exceeding the threshold). The first worker may therefore determine that the fourth worker device 316 has been attacked.

In some embodiments, a worker device may only be determined as having been attacked if a threshold is exceeded by all of the differences calculated using distributed inferences calculated using distributed models comprising layers of that worker device's local model. For example, the fourth worker device may only be identified as having been attacked if Diff(inf. 1, inf1241) and Diff(inf. 1, inf1341) (and Diff(inf. 1, inf1421) and Diff(inf. 1, inf1431) if these are also calculated) exceed a threshold.

In alternative embodiments, different techniques may be used to determine whether a worker device has been attacked form the differences calculated from inferences calculated using distributed models comprising layers of that worker device's local model. For example, a worker device may be determined as having been attacked if the average of all the differences calculated using distributed inferences calculated using distributed models comprising layers of that worker device's local model exceed a threshold.

In some embodiments, method may use more sophisticated or complicated techniques or algorithms to determine whether a worker device has been attacked using differences calculated using distributed inferences calculated using distributed models comprising layers of that worker device's local model. For example, later hidden layers of the machine learning models may have a more significant impact than earlier hidden layers. For example, the threshold for a determining whether a difference between a local inference and a distributed inference calculated using a distributed model comprising a layer from the local model of a given worker device indicates that that given worker device has been attacked may be dependent upon the position of the layer from the local model of the given worker within the distributed model.

FIG. 4B shows the differences 440, 442, 444 calculated by the fourth worker device 316 between its local inference inf. 4 and its distributed inferences inf4314, inf4124, and inf4234 at different severities of attack on the fourth worker device 316.

The distributed differences 440, 442, 444 are given as a proportion 410 of the local inference inf. 4 at different infection rates 420 of the fourth worker device 316 which are given as a proportion of the weights of the local model 330 of the four worker device 316 that have been compromised by an attack.

As shown in FIG. 4B, all three of the differences 440, 442, 444 between the local inference of the fourth worker device (inf. 4) and the distributed inferences inf4314, inf4124, and inf4234 increase substantially identically with the infection rate 420. All three of the distributed inferences inf4314, inf4124, and inf4234 are calculated using distributed models that comprise the input and output layers of the local model 330 of the attacked fourth worker device 316, and intermediate layers of local models 330 non-attacked worker devices 310, 312, 314. Therefore, all three distributed inferences diverge from the local inference inf. 4 (which includes no layers of the non-attacked worker devices' local models 330) as the infection rate 420 of the fourth worker device 316 increases.

As the infection rate 420 of the fourth worker device 316 increases, all of the differences 440, 442, 444 between the local inference inf. 4 and the distributed inferences inf4314, inf4124, and inf4234 increase until they exceed an application specific threshold together. At this stage, the fourth worker device 316 may determine that at least one of the first, third, and fourth worker devices 310, 314, 316 has been attacked (due to Diff(inf. 4, inf4314) exceeding the threshold), that at least one of the first, second, and fourth worker devices 310, 312, 316 has been attacked (due to Diff(inf. 4, inf4124) exceeding the threshold), but that at least one of the second, third and fourth worker devices 312, 314, 316 has been attacked (due to Diff(inf. 4, inf4234) exceeding the threshold). The differences therefore indicate that the fourth worker device has been attacked, and/or that the first, second and third worker devices have all been attacked. The fourth worker device may therefore determine that it has been attacked as this is significantly more likely than the second and third worker devices all having been attacked.

Figure 5:
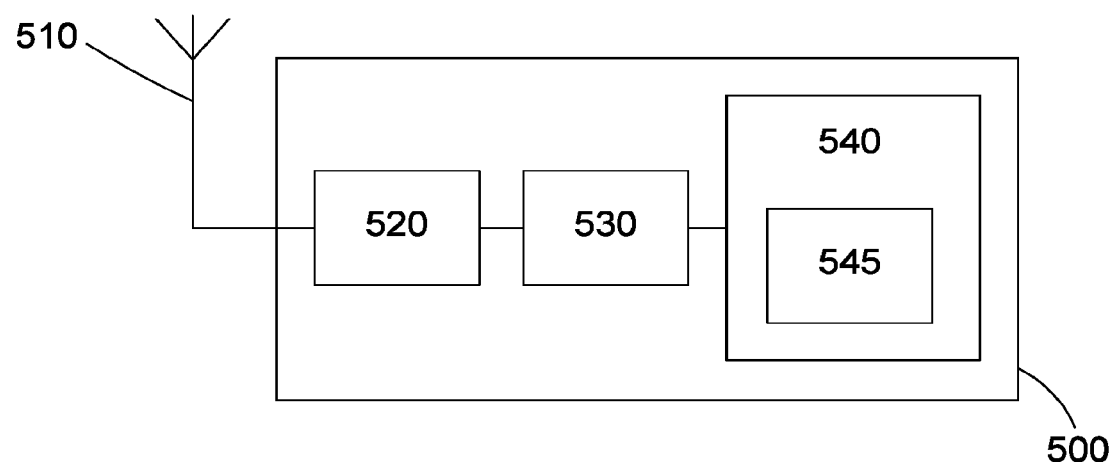
FIG. 5 is a diagram of a worker device.

FIG. 5 shows a diagram of a worker device 500 configured to perform methods for detecting attacks as described above. The worker device 500 comprises an antenna 510, an input output module 520, a processor 530, and a memory 540 containing computer instructions 545.

The input/output module 520 is communicatively connected to the antenna 510 and is configured to transmit and receive signals via the antenna. The computer instructions 545 are executable by the processor 530 to cause the processor 530 and/or the worker device 500 to perform a method as described above.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method, comprising:
   calculating a local inference from first input data using a first machine learning model of a first worker device, the first machine learning model including first layers of a plurality of layers of local machine learning models of a distributed artificial intelligence deployment, the distributed artificial intelligence deployment including a plurality of worker devices that include the local machine learning models, the first input data being collected by the first worker device;
   calculating a plurality of distributed inferences from the first input data using all possible distributed machine learning models including an input layer, an output layer, and a sequence of intermediate layers, the input layer and the output layer being included in the first machine learning model, the intermediate layers being included in other machine learning models of other worker devices included in the worker devices, the other machine learning models including a plurality of layers of local machine learning models that is not used by the first machine learning model, wherein the input layer and the output layer are from a same machine learning model;
   calculating a plurality of differences between the local inference and the distributed inferences, wherein a difference of the differences exceeding a threshold indicates that at least one of the layers of the local machine learning models is included in a worker device that has been attacked; and
   determining, based on which of the calculated differences exceeds the threshold, whether or not each of the worker devices is attacked, wherein which of the worker devices has been attacked is identified from which of the local machine learning models includes layers in all of the distributed machine learning models with which distributed inferences differ from the local inference by more than the threshold.

2. The method according to claim 1, wherein the first machine learning model is a local machine learning model of the first worker device.

3. The method according to claim 2, wherein an additional machine learning model including other machine learning models is a particular distributed machine learning model, the particular distributed machine learning model including at least one layer of a plurality of layers of the local machine learning model of another worker device of the other worker devices.

4. The method according to claim 3, wherein the particular distributed machine learning model includes intermediate layers, and all of the intermediate layers of the distributed machine learning models are intermediate layers of local machine learning models of different worker devices other than the first worker device, the distributed machine learning models including the particular distributed machine learning model.

5. The method according to claim 3, wherein the local machine learning model and the particular distributed machine learning model are artificial neural networks.

6. The method according to claim 5, wherein the local machine learning model and the particular distributed machine learning model include a same number of layers and a same number of neurons in same respective layers.

7. The method according to claim 1, wherein the plurality of the distributed inferences are calculated using a plurality of local machine learning models, the plurality of local machine learning models including different combinations of layers.

8. The method according to claim 5, wherein the local machine learning models includes possible combinations of layers including an input layer of the local machine learning model of the first worker device, an output layer of the machine learning model of the first worker device, and intermediate layers of local machine learning models of the other worker devices.

9. The method according to claim 7, further comprising:
   comparing the calculated differences between the local inference and the distributed inferences to the threshold; and
   identifying any of the plurality of local machine learning models which include layers in all of the other machine learning models with which the distributed inferences differ from the local inference of the first worker device by more than the threshold were calculated.

10. The method according to claim 9, wherein the distributed artificial intelligence deployment is a federated learning deployment.

11. The method according to claim 10, further comprising selectively aggregating all of the plurality of local machine learning models that do not include layers in all of the other machine learning models with which the distributed inferences differ from the local inference of the first worker device by more than the threshold were calculated.

12. The method according to claim 11, wherein the plurality of local machine learning models that do not include layers in all of the other machine learning models with which the distributed inferences differ from the local inference of the first worker device by more than the threshold were calculated are selectively aggregated to define a new machine learning model, and
   wherein the method further comprises replacing local machine learning models that include layers in all of the other machine learning models with which the distributed inferences differ from the local inference of the first worker device by more than the threshold were calculated with the new machine learning model.

13. One or more non-transitory storage media including computer instructions executable by one or more processors, the computer instructions, when executed by the one or more processors, causing the processors to perform a method comprising:

calculating a local inference from first input data using a first machine learning model of a first worker device, the first machine learning model including first layers of a plurality of layers of local machine learning models of a distributed artificial intelligence deployment, the distributed artificial intelligence deployment including a plurality of worker devices that include the local machine learning models, the first input data being collected by the first worker device;

calculating a plurality of distributed inferences from the first input data using all possible distributed machine learning models including an input layer, an output layer, and a sequence of intermediate layers, the input layer and the output layer being included in the first machine learning model, the intermediate layers being included in other machine learning models of other worker devices included in the worker devices, the other machine learning models including a plurality of layers of local machine learning models that is not used by the first machine learning model, the input layer and the output layer being a same layer, the layers corresponding to the worker devices;

calculating a plurality of differences between the local inference and the distributed inferences, wherein a difference of the differences exceeding a threshold indicates that at least one of the layers of the local machine learning models is included in a worker device that has been attacked; and determining, based on which of the calculated differences exceeds a threshold, whether or not each of the worker devices is attacked, wherein which of the worker devices has been attacked is identified from which of the local machine learning models includes layers in all of the distributed machine learning models with which distributed inferences differ from the local inference by more than the threshold.

14. A worker device comprising an antenna, a non-transitory memory, and a processor, the memory including computer instructions executable by the processor, the computer instructions when executed by the processor causing the processor to perform a method for detecting an attack on a distributed artificial intelligence deployment including a plurality of worker devices, the plurality of worker devices including local machine learning models, the method comprising:

calculating a local inference from first input data using a first machine learning model of a first worker device, the first machine learning model including first layers of a plurality of layers of the local machine learning models, the first input data being collected by the first worker device;

calculating a plurality of distributed inferences from the first input data using all possible distributed machine learning models including an input layer, an output layer, and a sequence of intermediate layers, the input layer and the output layer being included in the first machine learning model, the intermediate layers being included in other machine learning models of other worker devices included in the worker devices, the other machine learning models including a plurality of layers of local machine learning models that is not used by the first machine learning model, the input layer and the output layer being a same layer, the layers corresponding to the worker devices;

calculating a plurality of differences between the local inference and the distributed inferences, wherein a difference of the differences exceeding a threshold indicates that at least one of the layers of the local machine learning models is included in a worker device that has been attacked; and determining, based on which of the calculated differences exceeds a threshold, whether or not each of the worker devices is attacked, wherein which of the worker devices has been attacked is identified from which of the local machine learning models includes layers in all of the distributed machine learning models with which distributed inferences differ from the local inference by more than the threshold.

15. The worker device according to claim 14, wherein the device is further configured to calculate a distributed inference of the distributed inferences by transmitting data for partially calculating an inference to another worker device of the plurality of worker devices alongside an indication of a layer within the other worker device that is to be used for a partial calculation of an additional inference; and wherein the transmitted data is input data or data generated by a layer of the local machine learning model of the worker device.

16. The worker device according to claim 14, wherein the device is further configured to receive layers of local machine learning models of the other worker devices of the plurality of worker devices, and to generate a machine learning model of the other machine learning models using the received layers.

* * * * *